Patented July 8, 1947

2,423,611

UNITED STATES PATENT OFFICE 2,423,611

COPPER HYDROXY SOAPS

Arthur Minich, Westfield, N. J., assignor to Modex Products Co., Inc., Elizabeth, N. J., a corporation of New York No Drawing. Application November 10, 1943, Serial No. 509,811

1 Claim. (Cl. 167—22)

This invention relates to hydroxy copper soaps for use primarily as fungicides.

In my prior Patent No. 2,116,321, issued May 3, 1938, I disclose the method of making hydroxy copper naphthenate for use in connection with ink driers and fungicides. Hydroxy copper naphthenate produced by that prior patent is highly efficient for its intended purposes, but the end product, although in a granular form has a tendency to coalesce and thus lose its pulverulent, free-flowing character. This has caused considerable difficulty in connection with the application of this particular copper soap to cellulosic materials for the purpose of rotproofing. Moreover, it has been found that for certain applications the naphthenate odor of the treated cellulosic material was objectionable.

As a result of protracted experimentation and research, I am now able to eliminate or minimize the foregoing disadvantages. These results were obtained by substituting for naphthenic acid in the manufacture of the product, one or more other acids, for all or part of the naphthenic acid heretofore employed, and I have demonstrated that by so doing a superior product for fungicidal use results. It has been determined that the various hydroxy copper soaps which will be hereinafter described function very satisfactorily as efficient fungicides.

Examples of the procedure which I have practised follow:

EXAMPLE 1

COPPER HYDROXY SOAP OF NAPHTHENIC-STEARIC ACIDS

This soap was prepared in the following manner:

Into a reaction tank equipped with good agitation, there was introduced the following ingredients:

*Solution A*

| | Grams |
|---|---|
| Water | 1200 |
| Caustic soda (NaOH) | 54 |
| Naphthenic acid (215 acid number) | 100 |
| Stearic acid | 29 |

The reaction between the acids and the caustic soda took place with the result that all the acid was converted into a sodium soap of the corresponding acids. There was also available 34 grams of sodium hydroxide over and above the amount which was consumed in the process of neutralizing the water mixture.

To the homogeneous aqueous solution consisting of the free and unreacted sodium hydroxide and the sodium soap thus produced, was added under continued agitation:

*Solution B*

190 grams of copper sulfate crystals dissolved in 700 grams of water.

This amount of copper sulfate is sufficient to react not only with the sodium soap but also the free alkali hydroxide present, resulting in the formation of the hydroxy copper soap. This copper hydroxy soap precipitated out of the aqueous system in the form of a green colored magma. The water and the by-product salts were removed from the hydroxy copper soap and the latter was finally dried and comminuted into pulverulent form.

The end product contained 25% copper as compared with a metal content of only 12% for the normal copper soap of the same acid mixture. Said end product possesses considerably improved flowing qualities over that presented by a straight hydroxy copper naphthenate soap prepared without the use of the stearic acid.

The process of this example was carried out at room temperature, but it was also found feasible to employ lower temperatures.

EXAMPLE 2

HYDROXY COPPER SOAP OF HYDROGENATED ROSIN

In this case the procedure outlined in Example 1 was somewhat altered. In this case the following formula and process was employed.

Into a beaker equipped with an agitator was first introduced:

*Solution C*

A solution of 40 grams of sodium hydroxide in 520 grams of water.

*Solution D*

Separately an aqueous solution of copper sulfate was prepared by dissolving 190 grams of copper sulfate in 700 grams of water.

*Solution E*

A third solution was separately prepared by reacting together, in the presence of 1200 grams of water, 137 grams of hydrogenated rosin and 19 grams of sodium hydroxide. This solution E contained, as the reaction product, the sodium soap of the hydrogenated rosin.

The formation of the hydroxy copper soap was accomplished by reacting together the three solutions C, D and E in said beaker, under agitation. The water and by-product salts were removed as in Example 1 and the resulting soap was dried and comminuted to produce readily flowable pulverulent material. This hydroxy soap contains 24% copper as compared with only 9.4% for the neutral soap.

Tests showed that this end product functioned with complete satisfaction as a fungicide.

EXAMPLE 3

COPPER HYDROXY SOAP OF OLEIC ACID

Following the procedural steps of Example 1, the following ingredients were employed.

Solution A 1050 grams of water and 59 grams of caustic soda and 114 grams of oleic acid.

Solution B 190 grams of copper sulfate and 700 grams of water.

The product contains 27% copper as against 10% for the neutral copper soap. It constitutes a free-flowing pulverulent material which functions satisfactorily as a fungicidal agent.

EXAMPLE 4

HYDROXY COPPER SOAP OF OLEIC ACID CONTAINING AN ANTI-OXIDANT

Same procedure and formula as in Example 3, plus 1 gram of alpha naphthol, dissolved in the oleic acid. The alpha naphthol served as an anti-oxidant. That is to say, it protects the compound during manufacture and during subsequent storage against undesirable oxidation. This utilization of an anti-oxidant, while referred to specifically in this particular example, may be likewise availed of in connection with any of the other examples herein given, without departing from this invention.

I have also found that other anti-oxidants, such as alkyl phenols may be employed, either separately or in combination as may be desired.

EXAMPLE 5

HYDROXY COPPER SOAP OF COCOANUT FATTY ACIDS

The procedure of Example 2.

Solution C 1400 grams of water, 145 grams of an aqueous solution containing 25% sodium hydroxide.

Solution D 190 grams of copper sulfate and 700 grams of water.

Solution E 400 grams of water, 88 grams of an aqueous solution containing 25% sodium hydroxide and 109 grams of cocoanut fatty acids.

Solutions C, D and E were compounded and reacted, as specified in Example 2, to produce an end product having 28% copper, as compared with 13% for the normal soap of the same acids. Such end product was a free-flowing powder with satisfactory fungicidal properties.

I found it possible to vary the basicity of the hydroxy copper soap for any particular acid or acid combination in any of the examples given herein, within certain limits. This is accomplished by adjusting the ratios of the component ingredients entering into the reaction, as by increase or decrease in the amount of acid or increase or decrease in the amount of alkali hydroxide present, without departing from this invention as will appear from the following example wherein the ratios of the constituents in Example 1 are modified as indicated.

EXAMPLE 6

HYDROXY COPPER SOAP OF A COMBINATION OF NAPHTHENIC ACID AND STEARIC ACID

Solution A

| | Grams |
|---|---|
| Water | 1200 |
| Sodium hydroxide | 54 |
| Naphthenic acid, 215 acid number | 76 |
| Stearic acid | 24 |

Solution B

| | Grams |
|---|---|
| Copper sulphate | 190 |
| Water | 700 |

The end product possessed a metal content of about 30% copper. This compares with a metal content of approximately 10.5% for the neutral compound.

EXAMPLE 7

COPPER HYDROXY BENZOATE

Procedure according to Example 1.

Solution A 1400 grams of water, 83 grams of potassium hydroxide, and 98 grams of benzoic acid.

Solution B 190 grams of copper sulphate and 700 grams of water.

The end product produced has 30% copper as against approximately 20% for the normal copper benzoate. It is a free-flowing powder with good fungicidal properties.

EXAMPLE 8

HYDROXY COPPER SOAP OF 2-ETHYLHEXOIC ACID

Procedure of Example 2.

Solution C 700 grams of water and 80 grams 25% of an aqueous solution of NaOH.

Solution D 190 grams copper sulphate and 700 cc. water.

Solution E 500 cc. water, 153 grams 25% NaOH and 137 grams of 2-ethylhexoic acid.

24% copper in my salt as compared with 18% copper in neutral salt.

EXAMPLE 9

COPPER HYDROXY SOAP OF A COMBINATION OF NAPHTHENIC ACID AND HYDROGENATED ROSIN ACID

Procedure of Example 1.

Solution A 1200 cc. water, 233 grams 25% NaOH, 80 grams naphthenic acid and 18 grams hydrogenated rosin.

Solution B 190 grams copper sulphate and 700 cc. water.

30% copper in my hydroxy salt as compared with 11.5% copper in neutral salt.

EXAMPLE 10

HYDROXY COPPER SOAP OF A MIXTURE OF OLEIC AND NAPHTHENIC ACIDS

Procedure of Example 2.

*Solution C*

700 cc. water and 156 grams 25% NaOH.

*Solution D*

190 grams copper sulphate and 700 cc. water.

*Solution E*

500 cc. water, 75 grams 25% caustic soda, 75 grams oleic acid and 34 grams naphthenic acid.

28% copper in my hydroxy salt as compared with 10.7% copper in neutral salt.

EXAMPLE 11

HYDROXY COPPER SOAP OF A COMBINATION OF OLEIC ACID AND CONGO RESIN ACID

Procedure of Example 2.

*Solution C*

700 cc. water and 158 grams 25% caustic soda.

*Solution D*

190 grams copper sulphate and 700 cc. water.

*Solution E*

500 cc. water, 75 grams 25% NaOH, 100 grams oleic acid and 37 grams congo acid (acid number 70).

24% copper in my hydroxy soap as compared with 8.5% copper in neutral soap.

EXAMPLE 12

HYDROXY COPPER SOAP OF A COMBINATION OF COCOANUT FATTY ACIDS AND BENZOIC ACID

Procedure of Example 2.

*Solution C*

100 grams 25% NaOH, 700 cc. water.

*Solution D*

190 grams copper sulphate and 700 cc. water.

*Solution E*

133 grams 25% NaOH, 500 cc. water, 150 grams cocoanut fatty acids, (acid number 264) and 25 grams benzoic acid.

25% copper in my hydroxy soap as compared with 14.3% copper in neutral soap.

EXAMPLE 13

HYDROXY COPPER SOAP OF A COMBINATION OF NAPHTHENIC ACID AND CONGO RESIN ACID

Procedure of Example 1.

*Solution A*

1200 grams water, 233 grams 25% aqueous solution of NaOH, 110 grams naphthenic acid (acid number 230) and 19 grams congo resin acids, heat up acid mixture before adding it to NaOH.

*Solution B*

190 grams copper sulphate and 700 grams water.

My product comprises 24% copper as compared with 10% in neutral soap.

EXAMPLE 14

HYDROXY COPPER SOAP OF A COMBINATION OF NAPHTHENIC ACID AND PHTHALIC ACID

*Solution A*

1200 grams water, 233 grams 25% aqueous solution of NaOH, 100 grams naphthenic acid (acid number 230) and 19 grams phthalic anhydride.

*Solution B*

190 grams copper sulphate and 700 grams water. End product comprises 24% copper as compared with 12% in the neutral soap.

The end products of all of the examples given are of free-flowing pulverulent character and are highly satisfactory for fungicidal use.

In the foregoing I have given examples of hydroxy copper soaps or acids, which are substantially non-volatile, water-insoluble, organic, aromatic or aliphatic. In some examples, one or more of them are used exclusively, while in other examples certain of them are used together with naphthenic acid which is cyclic. One requirement is that the acid or acids used should be capable of producing hydroxy copper soap which is substantially water-insoluble and the other requirement is that such acid or acids should produce hydroxy copper soap which is pulverulent and free-flowing. All acids which fulfill the foregoing requirements may be employed, either singly or in combination, in the carrying out of the present invention.

There are some acids, however, such, e. g., as the tall oil acids or rosin acids which are very unstable, due to their tendency to oxidize and produce undesirable discoloration and instability in the end product. These acids may, however, be employed in carrying out the invention, if there is added to the formulation of the end products employing them any appropriate anti-oxidants, one example of which is given in Example 4 hereof. Other anti-oxidants which may be used are appropriate alkyl phenols, etc. By employing such anti-oxidants the tendency to oxidize is minimized to such extent that it is practical to employ such acids for the production of the end products of this invention.

While the hydroxy copper soaps of this invention have been particularly used as fungicidal agents, they also have marked utility as insecticidal and anti-fouling agents and the invention is therefore not limited solely to the fungicidal field.

Having thus fully described the invention, what I claim as new and desire to secure by Letters Patent is:

As a new chemical, fungicidal, anti-fouling, insecticidal compound: a dry granular hydroxy copper soap of a plurality of acids one of which is naphthenic acid and the remainder of which is selected from the soap-forming acid group consisting of oleic acid, 2-ethylhexoic acid, hydrogenated rosin, cocoanut fatty acid and stearic acid.

ARTHUR MINICH.

REFERENCES CITED

The following references are of record in the file of this patent:

UNITED STATES PATENTS

| Number | Name | Date |
| --- | --- | --- |
| 2,116,321 | Minich | May 3, 1938 |
| 2,157,767 | Long | May 9, 1939 |
| 2,199,829 | Bogdan | May 7, 1940 |
| 2,236,296 | Minich | Mar. 25, 1941 |
| 2,256,798 | Meidert | Aug. 5, 1941 |
| 2,287,116 | Minich | June 23, 1942 |
| 2,368,560 | Minich | June 30, 1945 |

Certificate of Correction

Patent No. 2,423,611.  July 8, 1947.

ARTHUR MINICH

It is hereby certified that errors appear in the above numbered patent requiring correction as follows: In the grant, lines 2 and 13, and in the heading to the printed specification, line 4, name of assignee, for "Modex" read *Nuodex*, as shown by the record of assignments in this Office; and that the said Letters Patent should be read with these corrections therein that the same may conform to the record of the case in the Patent Office.

Signed and sealed this 26th day of August, A. D. 1947.

[SEAL]

LESLIE FRAZER,
*First Assistant Commissioner of Patents.*